United States Patent Office 2,867,589
Patented Jan. 6, 1959

2,867,589

MOLDING COMPOSITION CONTAINING PHENOL-FORMALDEHYDE AND RUBBER

Carlton A. Richie, Toledo, Ohio, assignor to Owens-Illinois Glass Company, a corporation of Ohio No Drawing. Application July 26, 1957
Serial No. 674,310

5 Claims. (Cl. 260—17.2)

This invention relates to plastics and particularly to a molding composition for plastic closures such as are applied to glass containers.

In one method of manufacture of plastic closures for glass containers, a charge of plastic material in granular form is placed in a mold and the molded closure is formed by the application of heat and pressure. Among the more commonly used compositions are those containing a resin of the phenol-formaldehyde type to which are added fillers such as woodflour, coloring agents such as carbon black, and mold lubricating agents such as calcium or zinc stearate.

In molding compositions intended for use in the manufacture of plastic closures for glass containers, certain basic requirements must be fulfilled. The molding composition must be capable of being molded satisfactorily and should not require extensive periods of retention in the mold in order to effect cure of the resin. In addition, the composition should not stain the mold or be such that it easily flashes and creates waste on the article. In addition to these molding requirements, the resultant plastic closure must have sufficient impact resistance, resilience, dimensional stability, torque strength and must satisfactorily pass the "bleed" test, as hereinafter described.

It is therefore an object of this invention to provide an improved composition containing resin of the phenol-formaldehyde type for the manufacture of plastic closures such as are applied to glass containers.

Basically, the improved composition comprises a mixture of phenolic resin, a filler such as woodflour, and a vulcanized synthetic rubber composition of the butadiene-styrene type, more commonly known as Buna-S or GRS. I have determined that the most satisfactory results may be obtained by using a rubber composition of the GRS type containing sulfur wherein the ratio of the amount of sulfur to the amount of rubber is less than approximately 50%. The most satisfactory results have been obtained when the ratio of rubber composition to filler is less than 2:5. The beneficial results appear to be generally lost when the ratio of rubber composition to filler is less than 1:5.

According to my experiments a plastic composition containing phenolic resin, a filler such as woodflour, and a vulcanized synthetic rubber composition of the GRS type may be satisfactorily molded with a minimum of cure time required, without staining the molds. The resultant closure has improved impact resistance, resilience and dimensional stability. In addition a plastic closure made from this composition satisfactorily passes the "bleed" test.

Vulcanized rubber dust compositions

The vulcanized synthetic rubber compositions containing rubber and sulfur which have been found to be satifactory in molding compositions for plastic closures have the following compositions:

|  | I | II | III | IV | V |
|---|---|---|---|---|---|
|  | Percent | Percent | Percent | Percent | Percent |
| Rubber (GRS) | 68–70 | 12–17 | 18–20 | 40 | 65 |
| Sulfur | 30 | 8–9 | 8 | 16 | 27 |
| Ash content [1] | 1–2 | 10–15 | 28–35 | 8–11 | 3–4 |
| Combustibles |  | 72 |  |  |  |

[1] Determined by analysis using ASTM Standards on Rubber Products Designation D-297-55T, page 145.

Molding compositions

Among the molding compositions containing vulcanized synthetic rubber, which have been found to be satisfactory for manufacturing plastic closures, are the following:

|  | A | B | C | D | E |
|---|---|---|---|---|---|
|  | Percent | Percent | Percent | Percent | Percent |
| Resin (std. one stage phenolic) | 48 | 48 | 48 | 42 | 48 |
| Woodflour (std. minus 80 mesh) | 38 | 28 | 33 | 34 | 28 |
| Vulcanized rubber compositions | [1] 10 | [1] 20 | [2] 15 | [2] 20 | [3] 20 |
| Carbon black | 3 | 3 | 3 | 3 | 3 |
| Zinc or calcium stearate | 1 | 1 | 1 | 1 | 1 |

[1] Type I.
[2] Type II.
[3] Type III.

Impact resistance

Plastic closures made from the improved molding compositions have been found to show increased impact resistance when subjected to impact tests. For example in a test wherein a pendulum or hammer is dropped against plastic caps at increasing angles of swing, the following results were achieved:

Impact test

[10 tested each trial]

| Amt. of fall | Comp. B | Comp. D | Comp. E | Standard phenolic 48% resin 48% woodflour |
|---|---|---|---|---|
| 50° | OK | OK | OK | 7 OK, 3 cracked. |
| 55° | OK | OK | OK | All cracked. |
| 60° | OK | 7 OK, 3 cracked | OK | Do. |
| 65° | All cracked | All cracked | All cracked | Do. |

From the above tabulation it can be seen that plastic closures made from the improved molding compositions such as compositions B, D and E, show greatly improved impact resistance over plastic closures made from the standard phenolic compositions which are currently commercially used.

Bleed test

The bleed test is conducted in conjunction with the standard absorption test wherein sets of closures are weighed before and after a prolonged immersion. In the absorption test, one group of closures is immersed in distilled water whereas another group is immersed in a solution of equal volumes of distilled water and ethyl alcohol. The containers containing the immersed closures are placed in an oven at 122° F. for a period of seven days, after which the caps are removed and weighed to determine the gain in weight due to absorption. At this time, the bleed test is conducted in order to determine the discoloration effect of the closures on the solution. The light transmission is measured by a standard electrophotometer. According to tests accepted by the plastic industry, the transmission must not be less than 80%, which corresponds to a very light amber color. Tests conducted on plastic closures of my improved composition indicate excellent results. For example, plastic closures made from molding composition B showed 94% transmission in water and 91% transmission in water-alcohol.

In addition to the improved impact resistance and improved bleed test results, plastic closures made from the molding compositions have improved resilience and dimensional stability. Moreover, the closures may be satisfactorily molded with a minimum of cure time required, without staining the molds.

Modifications may be resorted to within the spirit and scope of the appended claims.

This application is a continuation-in-part of my copending application Serial No. 413,707, filed March 2, 1954, now abandoned, entitled "Molding Composition for Plastic Closures."

I claim:

1. A molding composition for plastic closures, each 100 parts by weight of said molding composition comprising 42-48 parts of an uncured phenol-formaldehyde resin, 28-38 parts of woodflour, 10-20 parts of vulcanized rubber composition, a small amount of carbon black and a small amount of stearate compound selected from the group consisting of zinc stearate and calcium stearate, each 100 parts by weight of said rubber composition comprising 12-70 parts of butadiene-styrene copolymer rubber, and 8-30 parts sulfur, said composition on combustion analysis yielding 1-35 parts ash content per 100 parts of rubber composition.

2. A molding composition for plastic closures, each 100 parts by weight of said molding composition comprising 48 parts of an uncured phenol-formaldehyde resin, 38 parts of woodflour, 10 parts of vulcanized rubber composition, a small amount of carbon black and a small amount of stearate compound selected from the group consisting of zinc stearate and calcium stearate, each 100 parts by weight of said rubber composition comprising 12-70 parts of butadiene-styrene copolymer rubber, and 8-30 parts sulfur, said composition on combustion analysis yielding 1-35 parts ash content per 100 parts of rubber composition.

3. A molding composition for plastic closures, each 100 parts by weight of said molding composition comprising 48 parts of an uncured phenol-formaldehyde resin, 28 parts of woodflour, 20 parts of vulcanized rubber composition, a small amount of carbon black and a small amount of stearate compound selected from the group consisting of zinc stearate and calcium stearate, each 100 parts by weight of said rubber composition comprising 12-70 parts of butadiene-styrene copolymer rubber, and 8-30 parts sulfur, said composition on combustion analysis yielding 1-35 parts ash content per 100 parts of rubber composition.

4. A molding composition for plastic closures, each 100 parts by weight of said molding composition comprising 48 parts of an uncured phenol-formaldehyde resin, 33 parts of woodflour, 15 parts of vulcanized rubber composition, a small amount of carbon black and a small amount of stearate compound selected from the group consisting of zinc stearate and calcium stearate, each 100 parts by weight of said rubber composition comprising 12-70 parts of butadiene-styrene copolymer rubber, and 8-30 parts sulfur, said composition on combustion analysis yielding 1-35 parts ash content per 100 parts of rubber composition.

5. A molding composition for plastic closures, each 100 parts by weight of said molding composition comprising 42 parts of an uncured phenol-formaldehyde resin, 34 parts of woodflour, 20 parts of vulcanized rubber composition, a small amount of carbon black and a small amount of stearate compound selected from the group consisting of zinc stearate and calcium stearate, each 100 parts by weight of said rubber composition comprising 12-70 parts of butadiene-styrene copolymer rubber, and 8-30 parts sulfur, said composition on combustion analysis yielding 1-35 parts ash content per 100 parts of rubber composition.

No references cited.